Jan. 24, 1967 W. ROSENBLUTH 3,300,655

LINEAR SWEEP SIGNAL GENERATOR

Filed Nov. 15, 1963

United States Patent Office 3,300,655
Patented Jan. 24, 1967

3,300,655
LINEAR SWEEP SIGNAL GENERATOR
William Rosenbluth, Hollis, N.Y., assignor to Hazeltine Research Inc., a corporation of Illinois
Filed Nov. 15, 1963, Ser. No. 324,127
3 Claims. (Cl. 307—88.5)

Figure 1:
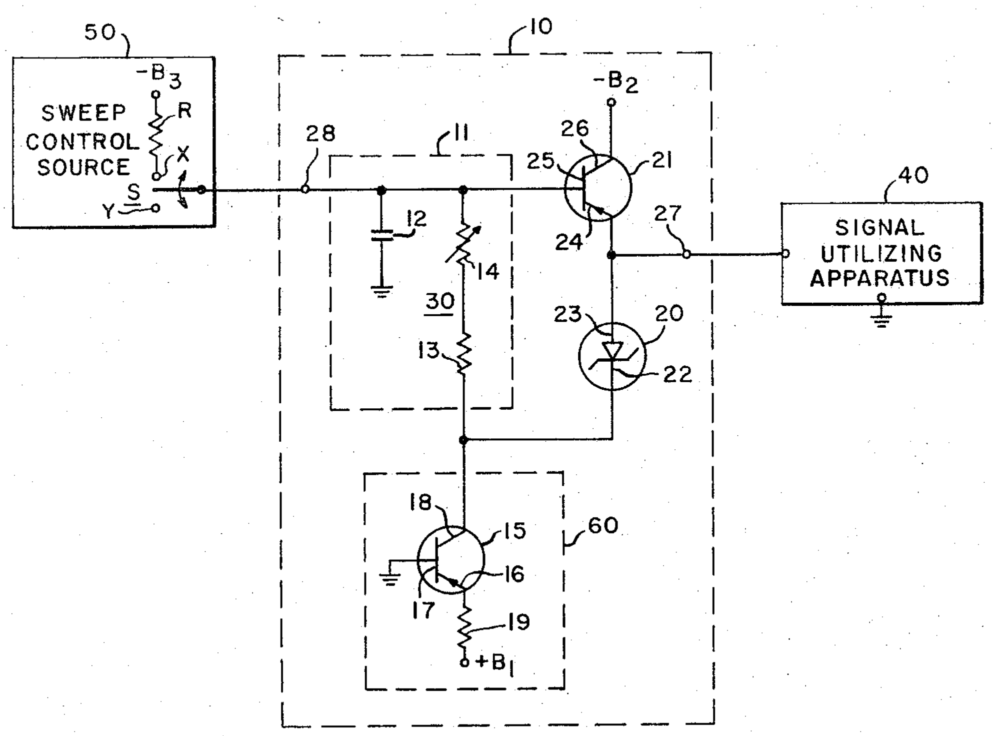

The present invention relates to a linear sweep signal generator of the type having a capacitive element upon which charge is deposited to form the desired sweep signal. Although the invention is described with reference to a transistor sweep signal generator, it will be appreciated by those having ordinary skill in this particular art, that the teachings of the present invention are equally applicable to vacuum tube sweep signal generators as well.

One type of transistor sweep signal generator heretofore proposed utilizes a transistor having emitter, base, and collector electrodes connected in such a manner as to cause the transistor to operate as a constant current source. Specifically, the transistor is connected in a grounded base configuration and is operated with a constant input voltage and source resistance so that the emitter current that flows is constant. The collector current that flows is assumed to be constant and independent of any voltage variations at the collector electrode. This collector current is then used to charge a capacitor, the sweep signal being developed thereacross. However, as is well known, the collector current that flows is, in reality, only nominally constant and not perfectly constant. Thus, the sweep signal developed across the capacitor will be only approximately linear. All other things being equal, the departure from linearity will increase as the parameters of the transistor change.

It is an object of the present invention, therefore, to provide a new and improved transistor sweep signal generator which develops an output voltage waveform which increases linearly with time, the linearity being unaffected by variations in transistor parameters.

Other objects and advantages will appear from the following description of the invention.

In accordance with a particular form of the invention, a linear sweep signal generator includes a charging network, including a resistive element connected to a capacitor and through which current flows to charge the capacitor. The sweep signal generator also includes current source means connected to the charging network for providing at least a portion of the charging current, the portion so provided having a tendency to vary undesirably. The generator finally includes means for maintaining a constant potential difference across the resistive element of, and for isolating the undesirably varying current from, the charging network. In this manner, the charging current is maintained constant.

For a better understanding of the present invention together with other and further objects thereof, reference is had to the following description taken in connection with the accompanying drawing, and its scope will be pointed out in the appended claims.

Figure 2:
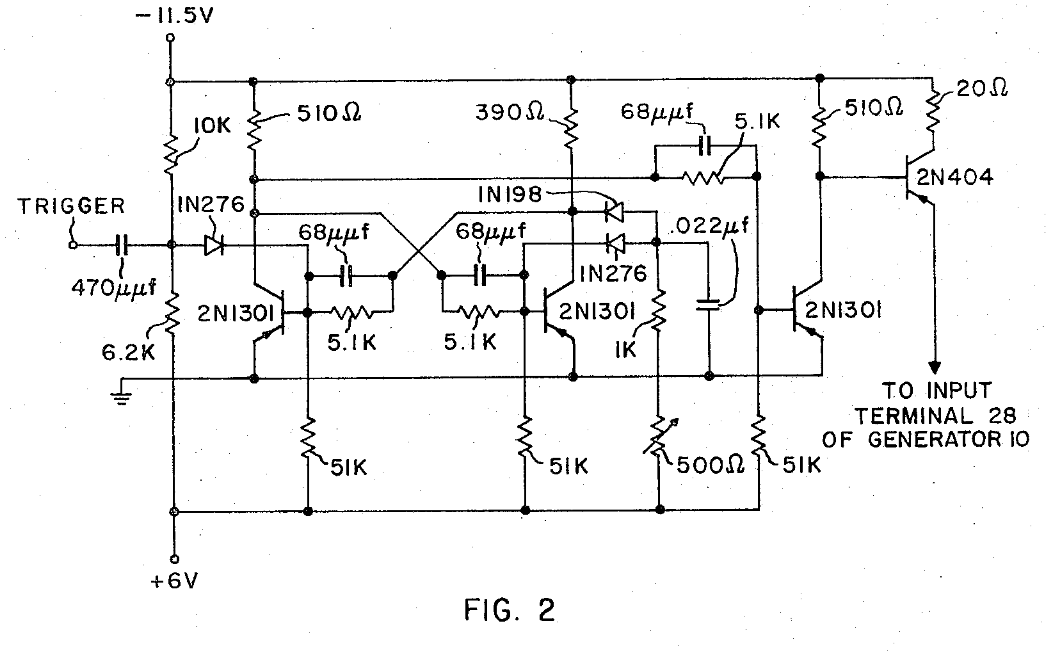

Referring to the drawing:

FIG. 1 is a circuit diagram of a linear sweep signal generator constructed in accordance with the present invention, and FIG. 2 is a circuit diagram of a control source which may be used with the sweep signal generator of FIG. 1 to control the duration of the generated sweep signal.

*Description and operation of the linear sweep signal generator of FIG. 1*

Referring to FIG. 1 of the drawing, the linear sweep signal generator 10 includes a charging network 11 which, in turn, includes a variable resistive element 30 connected to a capacitor 12, one end of which is grounded. Element 30 may include, for example, a resistor 13, serially connected to a potentiometer 14. As will be described hereinafter, current is supplied through resistor 13 and potentiometer 14 to deposit charge upon capacitor 12 in such a manner as to generate an output voltage waveform which increases linearly with time.

Sweep signal generator 10 also includes current source means 60 connected to network 11 for providing at least a portion of the charging current for capacitor 12. Means 60 specifically includes a transistor 15 having emitter, base, and collector electrodes 16, 17, and 18, respectively. The collector electrode 18 is connected to network 11 and, more particularly, to the end of resistor 13 remote from potentiometer 14. The emitter electrode 16 is connected through an emitter resistor 19 to a source of positive potential $+B_1$. The base electrode 17 is connected to ground potential. In this manner, a constant current flows through the emitter-base junction of transistor 15. As heretofore pointed out, the current flowing out from collector electrode 18 with such a bias arrangement is not perfectly constant but varies somewhat as the voltage at the collector electrode 18 varies.

Sweep signal generator 10 additionally includes means for maintaining a constant potential difference across resistive element 30 of, and for isolating the variations in the collector current of transistor 15 from, charging network 11. This means includes a potential breakdown device, for example, a zener diode 20 and a nonloading potential transfer device, for example, a transistor 21 connected in an emiter-follower configuration. The cathode electrode 22 of zener diode 20 is connected to the junction of the collector electrode 18 of transistor 15 with the end of resistor 13 remote from potentiometer 14. The anode electrode 23 of zener diode 20 is connected to the emitter electrode 24 of transistor 21 which, in turn, is connected to output terminal 27. The base electrode 25 of transistor 21 is connected to the charging network 11 and, more particularly, to the junction of the end of potentiometer 14 remote from resistor 13 with the end of capacitor 12 remote from ground. The collector electrode 26 of transistor 21 is connected to a source of negative potential $-B_2$. Thus, zener diode 20 is connected in series with the emitter-base junction of transistor 21 and the series network so formed is coupled across resistive element 30.

In operation, the collector current of transistor 15 divides into two components at the collector electrode 18, the components being of widely different but approximately constant magnitude. The smaller component flows through resistor 13 and potentiometer 14, while the larger component flows through the zener diode-transistor network 20, 21. The larger component of current is of sufficient magnitude to cause zener diode 20 to operate at a point in its regulating range in which the potential difference developed across the zener diode remains substantially constant as the current flowing through its varies. However, since the current flowing through zener diode 20 is approximately constant to begin with, a cascading effect is produced, the result of which is that the potential difference developed across zener diode 20 is maintained constant.

The approximately constant current flowing through zener diode 20 flows into the emitter electrode 24 of transistor 21. In the transistor 21, the current also divides into two components of widely different but approximately constant magnitude. The larger component flows out to the collector electrode 26 to the $-B_2$ supply while the small component, approximately 1% of the input emitter current, flows out of the base electrode 25.

Since the base to emitter voltage drop in transistor 21 remains substantially constant as the current flowing in the emitter circuit thereof varies, by maintaining the emitter current approximately constant in the above described manner, a second cascading effect is produced, the result of this effect being that the base to emitter voltage drop in transistor 21 is also maintained constant.

Whenever it is desired to generate a sweep signal, switch S of sweep control source 50 is switched to its Y or open position. Switch S symbolically represents the output circuit of any control source which will allow capacitor 12 to charge and discharge in the presently described manner. Switch S may represent, for example, the output circuit of the control circuit shown in FIGURE 2.

With switch S in position Y two currents flow into capacitor 12, the base current of transistor 21 and the current flowing through resistor 13 and potentiometer 14. Since the base current of transistor 21 is very much smaller than the current flowing through resistor 13 and potentiometer 14, the charging of capacitor 12 is due entirely to the latter current. As capacitor 12 charges up, the voltage developed across it, or more particularly, the voltage developed at its upper terminal increases. This increase in voltage is transferred unattenuated thorough the base emitter junction of transistor 21 and through zener diode 20 to the collector electrode 18 of transistor 15. Thus, the voltage at the collector electrode 18 of transistor 15 increases in the same amount, and in the same direction as, the increase in voltage at the base electrode 25 of transistor 21. This tracking of voltage variations at the collector electrode 18 of transistor 15 is such that the potential difference developed across resistive element 30 is maintained constant and independent of the particular voltage developed across capacitor 12. Thus, the charging current flowing through resistor 13 and potentiometer 14 is maintained constant and, as a result, capacitor 12 charges in a linear fashion.

Whenever it is desired to terminate the developed sweep signal, switch S is switched to its X position. With switch S so connected, capacitor 12 discharges through a 20-ohm resistor R to the —11.5-volt supply $-B_3$. Since the rate of discharge is determined by the values of capacitor 12 and resistor R, both of which are made small, the rate of discharge is very rapid.

In this manner, a linear sweep signal having a very short recovery time is developed at output terminal 27, the slope of the sweep signal being determined by the rate at which capacitor 12 is charged, i.e., by the setting of potentiometer 14. The sweep signal so developed at the emitter electrode 24 of transistor 21 may then be coupled through output terminal 27 to the signal utilizing apparatus 40 which may be the cursor deflection system of a radar display.

While applicant does not wish to be limited to any particular set of circuit constants, the following have proved useful in the sweep signal generator of FIGURE 1.

| | |
|---|---|
| Capacitor **12**, micromicrofarads | 6800 |
| Resistor **13**, kilohms | 1.6 |
| Resistor **19**, ohms | 620 |
| Potentiometer **14**, kilohms | 1 |
| Transistor **15** | 2N404 |
| Transistor **21** | 2N1301 |
| Zener diode **20** | 1N465A |
| Potential $+B_1$, volts | +6 |
| Potential $-B_2$, volts | —11.5 |

With the above component values so established, the sweep signal developed at the output terminal 27 of generator 10 is a positive-going signal having a nonlinearity of less than 0.7% and a recovery time of less than 0.7 microsecond.

A negative-going sweep signal having similar characteristics may be generated by reversing the polarities of the potential sources of FIG. 1, the polarity of zener diode 20, and the polarity of the transistors 15 and 21.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A linear sweep signal generator utilizing cascaded control effects to achieve increased linearity comprising:
   - a charging network including a resistive element and a capacitor coupled to said resistive element through which current flows to charge said capacitor;
   - a zener diode for maintaining the potential across the resistive elements of said charging network substantially constant, the maintenance of said charging potential being undesirably subject to variation due to changes in zener diode current flow;
   - and a source of constant current, coupled to said charging network to provide a substantially constant charging current and coupled to said zener diode to stabilize zener diode current, for providing cascaded control effects with said constant current source insuring maintenance of said charging potential by said zener diode free from variations due to changes in zener diode current flow, thereby providing sweep signals of increased linearity.

2. A linear sweep signal generator as described in claim 1, wherein the zener diode is serially connected to an emitter follower which performs a nonloading potential transfer function and provides the sweep signal output, the series network so formed being coupled across the resistive elements of the charging network.

3. A linear sweep signal generator comprising:
   - a charging network, including a variable resistive element and a capacitor coupled between one end of said resistive element and a ground potential, through which current flows to charge said capacitor;
   - a zener diode, having cathode and anode electrodes, for maintaining the potential across the resistive element of said charging network substantially constant, the maintenance of said charging potential being undesirably subject to variation due to changes in zener diode current flow;
   - an emitter-follower having an emitter electrode which is serially coupled to the anode electrode of said zener diode, and a base electrode which is coupled to the junction between said capacitor and said resistive element, and a collector electrode which is connected to a first source of potential, said emitter follower performing a nonloading potential transfer function and providing the sweep signal output;
   - and a semiconductor device which provides a constant current at a collector electrode thereof, which is coupled to said resistive element to provide a substantially constant charging current and coupled to the cathode of said zener diode to stabilize zener diode current, for providing cascaded control effects with the constant current provided by said semiconductor device insuring maintenance of said charging potential by said zener diode free from variations due to changes in zener diode current flow, thereby providing sweep signals of increased linearity.

References Cited by the Examiner

UNITED STATES PATENTS

| | | | |
|---|---|---|---|
| 2,891,173 | 6/1959 | Helbig | 307–88.5 |
| 2,923,837 | 2/1960 | Willett | 307–88.5 |
| 2,998,532 | 8/1961 | Smeltzer | 307–88.5 |
| 3,011,068 | 11/1961 | McVey | 307–88.5 |
| 3,050,686 | 8/1962 | Koriff et al. | 328–183 |

ARTHUR GAUSS, *Primary Examiner.*

S. D. MILLER, *Assistant Examiner.*